2,869,251

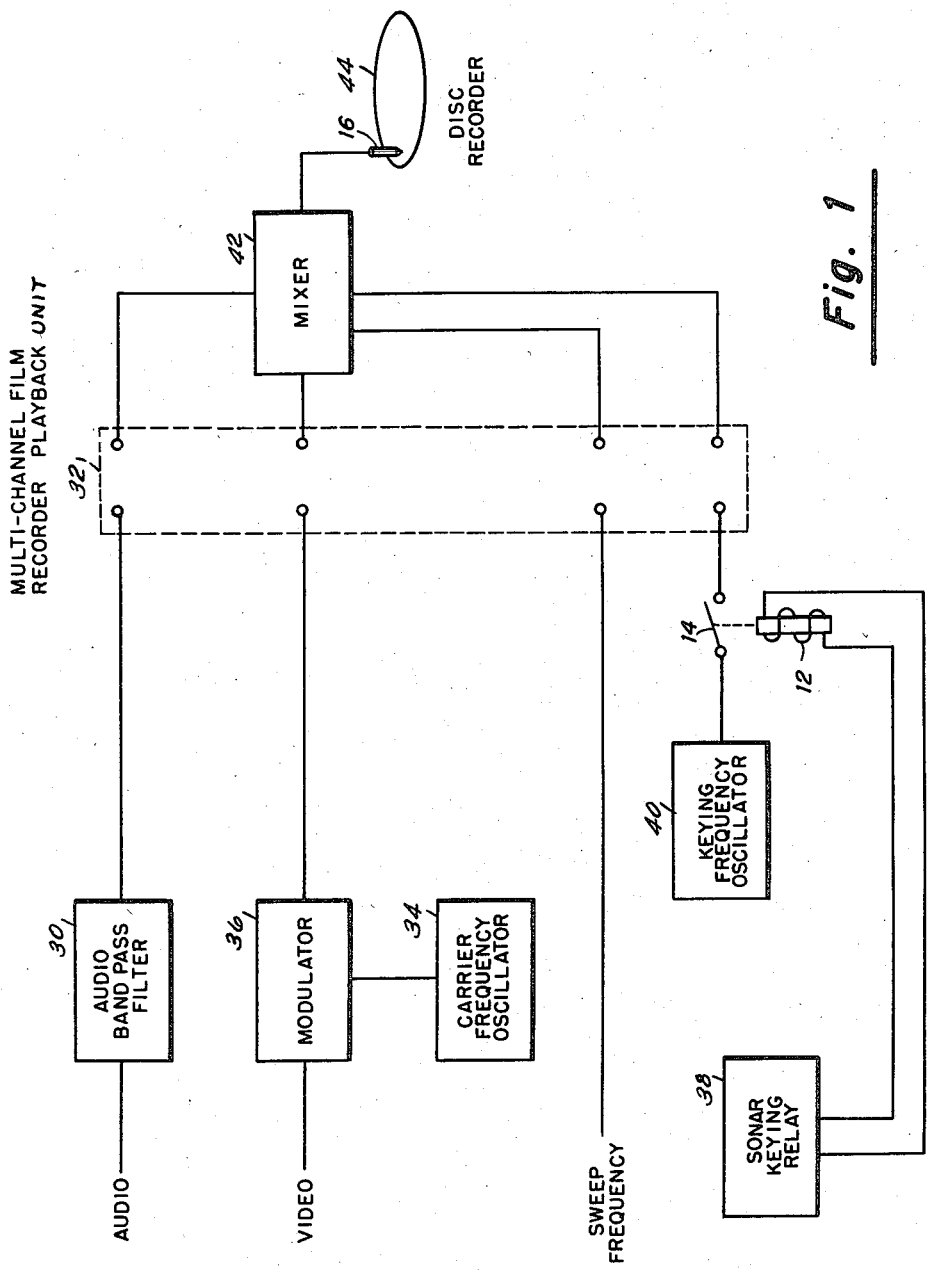

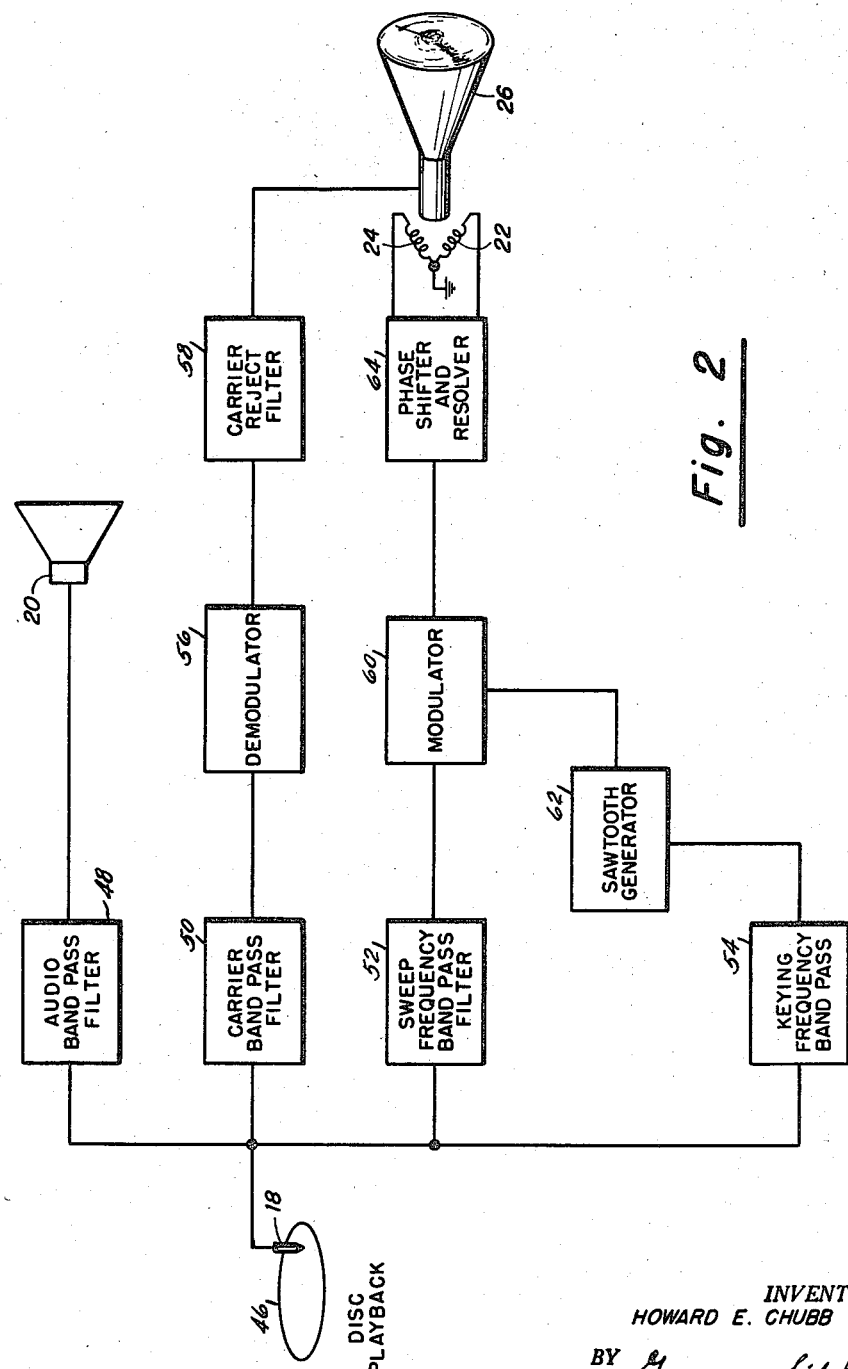

METHOD AND APPARATUS FOR RECORDING AND REPRODUCING A VIDEO DISPLAY AND ITS AUDIO COUNTERPART

Howard E. Chubb, San Diego, Calif.

Application July 19, 1954, Serial No. 444,407

2 Claims. (Cl. 35—10.4)

(Granted under Title 35, U. S. Code (1952), sec. 266)

The invention described herein may be manufactured and used by or for the Government of the United States of America for governmental purposes without the payment of any royalties thereon or therefor.

This invention relates to training devices and more particularly to a method and apparatus for reproducing the visual displays and audio signals of an electronic scanning system such as sonar or radar during tactical operation.

Trainers previously developed for simulating or reproducing the visual display and auto of a scanning system such as sonar or radar have utilized synthetic information from problem generators or manual controls to provide a simulated video display with its audio counterpart, or presented still or moving pictures of the display scope of the scanning system taken during the tactical operation usually accompanied by a recorded audio. The flying spot technique has also been tried in conjunction with the still picture frames and utilizing a system such as that used in conjunction with the RCA 5W P15 tube. However, these systems did not present a sufficiently realistic display or else consisted of a static rather than a dynamic presentation of the information.

The present invention consists essentially of a method and apparatus for recording the audio, sweep and video information directly from the electronic circuits for the visual display scope of equipment such as sonar during an actual run while tracking a submarine. The audio information limited by a band pass filter to a limited range of frequency which will not interfere with the other frequencies being recorded, the video information modulating a carrier frequency, a constant amplitude sweep frequency, and timed pulses from a "keying" oscillator are recorded on separate channels of a multi-channel film recorder and playback apparatus during an actual run at sea. At a later time these separate channels can be mixed and recorded on a disc recorder ashore where the ship movement will not interfere with the recording technique. The composite signal may be reproduced from the disc at any time it may be desired to reproduce the visual display and audio signals for training purposes. The individual signals are separated by band pass filters with the audio information going to a loudspeaker or earphones as desired, and the video information being demodulated and transmitted through a carrier reject filter and applied directly to the grid of a cathode ray oscilloscope. The constant amplitude sweep frequency which was recorded is modulated by the signal from a sawtooth generator which is keyed by the pulse at the keying interval. The keying pulse maintains the sawtooth generator at the same repetition rate as that in the original equipment from which the recording was made. The sawtooth sweep signal is then passed through a phase shifter and resolver which generates the two phases of the sweep signal and permits phase control to orient the display with respect to true north.

A more elaborate and accurate system constituting an improvement over the present system is disclosed in the co-pending application of Chubb et al., Serial No. 444,406, filed July 19, 1954, for a Method for the Simultaneous Recording and/or Reproducing of Audio, Video, etc.

One object of the present invention is to provide a method and apparatus for recording and reproducing a video display and its audio counterpart.

Another object of the present invention is to provide an improved sonar recognition training device wherein the original sonar visual display and its audio counterpart are realistically reproduced as a substantial replica of the sonar presentation aboard ship during tactical operations.

A further object of the present invention is to provide a method and apparatus for the recording and reproduction of the sweep, video and audio electrical signals for reproducing a realistic visual display properly oriented with respect to the original display and together with the corresponding audio output.

Other objects and many of the attendant advantages of this invention will be readily appreciated as the same becomes better understood by reference to the following detailed description when considered in connection with the accompanying drawings wherein:

Fig. 1 is a block diagram illustrating one preferred embodiment of a method and apparatus for recording in accordance with the present invention; and Fig. 2 is a block diagram illustrating one preferred embodiment of a method and apparatus for reproducing the video and audio information recorded by the apparatus in Fig. 1.

One conventional scanning system with which the training device specifically disclosed herein may be used comprises a projecting and receiving sonar transducer having a plurality of sections arranged to cover 360° of azimuth. All sections of the transducer are energized to project an omni-directional pulse while a scanning switch rotating at some convenient frequency such as 30 cycles per second successively connects adjacent transducer sections to the receiver. The equipment includes a speaker for aural presentation of echoes and a cathode ray tube for visual presentation of range and bearing. The sweep of the CRT is a spiral produced by two or more amplitude modulated sine waves which may be generated in two or more stator coils by a rotor coil inductively coupled thereto and mechanically driven by the scanning switch drive whereby synchronism between the sine waves and the scanning transducer receiving beam is ensured despite variations in the ship's power supply and the use of a non-synchronous motor drive. Each sine wave is amplitude modulated by a D.-C. sawtooth wave having a frequency equal to the keying frequency which may be from 0.5 to 0.1 cycles per second, depending upon the selected range scale, and keyed by the transmitted pulse through the pulse keying relay. The modulated sine waves are applied to the deflection controls of the CRT. Thus there is produced a beam trace which sweeps angularly about the center of the CRT screen in synchronism with the azimuth sweep of the transducer receiving pattern and which moves radially outwardly at the much lower frequency (pulse repetition rate) determined by the rate of increase of the amplitude of the sawtooth envelope to provide the spiral sweep. Echoes received by the several transducer sections are fed through the scanning switch, suitably amplified, and applied to the intensity control of the CRT whereby the position of the echo intensified beam trace indicates both bearing (measured angularly from a line through the center of the screen) and range (measured radially from the center of the screen) of the target when the sweep is properly oriented relative to the scanning switch and transducer. Suitable bearing and range cursors are electronically painted on the screen by time sharing the outputs of such cursor circuits with the outputs of the sweep circuits. The stern pipper showing own ship's bearing employs pulses produced from and in synchronism with the 30 cycles per second scanning rate to intensity modulate one point on each circular sweep of the beam trace.

Referring now to the recording unit illustrated in Fig. 1 in block diagram form, the audio information from the electronic circuits of a conventional scanning sonar installation is limited by the audio band pass filter 30 to a range of frequencies which will not interfere with the other frequencies being recorded, and it is recorded on one channel of a multi-channel film recorder and playback unit 32. The output from a carrier frequency oscillator 34 is modulated in modulator 36 by the video information which is also obtained directly from the electronic circuits of the sonar and recorded on another channel of the multi-channel film recorder and playback unit.

One phase of the sweep frequency at constant amplitude is also obtained from the sweep circuits of the sonar and is recorded on a third channel of the film recorder unit. The sonar keying relay 38 of the shipboard sonar installation is used to actuate a relay 12 which closes contacts 14 to transmit a short pulse from a keying frequency oscillator 40 to provide a correlation between the repetition rate of the sweep on the shipboard sonar with the repetition rate of the sweep on the reproducing apparatus.

Since the sweep frequency preferably recorded with this unit is at 30 cycles per second the keying frequency should be selected at some frequency such as 70 cycles per second which will not interfere with the 30 cycles sweep frequency.

The multi-channel film recorded was utilized for the ship-board recording since the fidelity was not seriously affected by the movement of the ship as would be a disc recorder and it provided a means during experimental and development work to record up to 13 different signals of various portions of the electronic circuits of the scanning sonar. Thus at later times certain of the signals could be selected and combined or mixed in mixer 42 for recording on the single channel of the disc recorder 44 by means of the cutting head 16. In this manner additional factors which might be of benefit in training sonar operators could be recorded and later displayed in a suitable manner, if desired. However, all of the signals could be recorded on one channel, using a multiplexing technique on board ship, using a suitable recorder substantially unaffected by the ship's movements.

The playback unit as illustrated in Fig. 2 is one preferred embodiment of this portion of the invention and consists of a disc playback unit 46 which may utilize the same disc as recorder unit 44 and which plays back the combined signal recorded on the disc through a listening head 18.

The individual signals are separated by suitable band pass filters 48, 50, 52, 54, the audio being transmitted directly to a loudspeaker 20 or to other suitable listening units such as headphones. The modulated carrier after being separated by the carrier band pass filter 50 is demodulated in demodulator 56 and transmitted through the carrier reject filter 58 directly to the grid of the cathode ray oscilloscope 26.

The sweep frequency is also filtered by a band pass filter 52 and transmitted to the modulator 60. The keying frequency pulses are separated by the keying frequency band pass filter 54 and the pulses are transmitted to a sawtooth generator 62, where D. C. sawtooth signals are generated at the same repetition rate as the sawtooth sweep in the shipboard equipment. The D. C. sawtooth signals also enter the modulator 60 and modulate the constant amplitude 30 cycles sweep frequency to provide one phase of a spiral sweep comprising a 30 cycles sine wave having a sawtooth envelope. The single phase spiral sweep passes through a phase shifter and resolver 64 where the two phase spiral sweep is generated and transmitted to deflection coils 22 and 24 for the scope 26. By shifting the phase of the spiral sweep, the picture or display as indicated on the face of the tube 26 may be properly oriented to display the picture with respect to true north in the same manner that it was presented on the original equipment during the tactical run.

The various components and circuitry shown in the drawings in block diagram form are conventional and well known to those skilled in the art. There are available to those skilled in the art a number of published complete descriptions of the details of the circuitry of which the functions and characteristics are described above. The selection of a particular one of several circuits which will function equally well in the practice of the disclosed invention is but a matter of choice and independent of the inventive concept disclosed. For example, band pass filters 30, 48, 50, 52, and 54 may be of the type disclosed in Table 4, type IVA, page 231 of "Radio Engineer's Handbook," F. E. Terman, first edition, published by McGraw-Hill Book Company, copyright 1943. A typical circuit which may be employed for modulators 36 and 60 is shown in Fig. 13, page 543, ibid. Oscillators 34 and 40 may be of the type shown in Fig. 2, page 481, ibid. Demodulator 56, reject filter 58, and sawtooth generator 62 may respectively be of the types shown in Fig. 25, page 554, Fig. 23, page 918, and Fig. 35(b) or (d), page 515, ibid. The phase shifting network of the phase shifter and resolver 64 may be of the type shown in Fig. 56(a), page 949, ibid, and may feed the resolver or dual output phase shifting circuit shown in Fig. 4.32, page 136, of "Waveforms," volume 19, of the Massachusetts Institute of Technology Radiation Laboratory Series, published by McGraw-Hill Book Company, copyright 1949. Mixing circuits which are suitable for use as mixer 42 are shown in Fig. 18.15, page 644, of "Waveforms," volume 19, of the Massachusetts Institute of Technology Radiation Laboratory Series, published by McGraw-Hill Book Company, copyright 1949.

It will be apparent that suitable amplifiers may be provided where necessary to reinforce and control the signals at various points in the circuits. The selection and operation of these amplifiers will be adjusted to the requirements of mixing and transmitting of the signals and for the operation of the loudspeaker 20 and cathode ray oscilloscope 26.

Another method of reproducing the spiral sweep which could be utilized in conjunction with the present invention consists of recording the 30 cycle repetition rate of the stern pipper from the scanning sonar equipment. These "pipper" pulses can then be used to synchronize a 30 cycle spiral sweep for application to the deflection coils of the cathode ray oscilloscope. However, this system does not provide as satisfactory results as the system illustrated herein in Figs. 1 and 2.

Obviously many modifications and variations of the present invention are possible in the light of the above teachings. It is therefore to be understood that within the scope of the appended claims the invention may be practiced otherwise than as specifically described.

What is claimed is:

1. Apparatus for reproducing the visual and audio presentations of an electronic scanning system comprising a recording having a plurality of individual signals applied thereto in composite form, one of said signals being a replica of the audio signals in said system, a second signal being a replica of the video supply of said system, a third signal being characteristic of the sweep supply of said system, a fourth signal being characteristic of the repetition rate of said sweep supply, means for reproducing said composite signal, means for separating said composite signal into separate signals corresponding to the individual recorded signals, means for reproducing the audio presentation from said audio signal, a display device having deflection elements and an intensity control, means for applying the video signal to said intensity control, means for developing sweep voltages from said sweep signal and said reproduced fourth signal corresponding to the sweep voltages in said system, and means for applying said sweep voltages to the deflection elements of display device.

2. Apparatus for reproducing the visual and audio presentations of an electronic scanning system comprising a recording having a plurality of individual signals applied thereto in composite form, one of said signals being a replica of the audio signals in said system, a second signal being a replica of the video supply of said system, a third signal being a constant amplitude A. C. signal at the sweep frequency of said system, a fourth signal being a pulse train at the repetition rate of the sweep of said system, means for separating said composite signal into separate signals corresponding to the individual recorded signals, means for reproducing the audio presentation from said audio signal, a display device having deflection elements and an intensity control, means for applying the video signal to said intensity control, means for generating a sawtooth signal having the same frequency as the repetition rate of said fourth signal, means for modulating said constant amplitude A. C. signal with said sawtooth signal to provide a sweep voltage corresponding to one phase of the sweep voltages in said system, means for developing multi-phase sweep voltages from said modulated single phase sweep voltage means for shifting the phase of said sweep voltages, and means for applying said sweep voltages to the deflection elements of said display device.

References Cited in the file of this patent

UNITED STATES PATENTS

| | | |
|---|---|---|
| 2,168,049 | Skellett | Aug. 1, 1939 |
| 2,279,018 | Wolfe | Apr. 7, 1942 |
| 2,375,004 | Knowles | May 1, 1945 |
| 2,459,679 | Beyer et al. | Jan. 18, 1949 |
| 2,517,591 | Nightenhelser | Aug. 8, 1950 |
| 2,578,939 | Moran | Dec. 18, 1951 |
| 2,605,556 | Jones | Aug. 5, 1952 |
| 2,617,982 | Holschuh et al. | Nov. 11, 1952 |
| 2,674,812 | Hales | Apr. 13, 1954 |
| 2,678,382 | Horn et al. | May 11, 1954 |
| 2,679,035 | Daniels et al. | May 18, 1954 |
| 2,775,828 | Harwood | Jan. 1, 1957 |